Sept. 29, 1959

R. L. COTTA 2,906,178

HOB SHIFTING MECHANISM

Filed Sept. 4, 1956

INVENTOR.
RALPH L. COTTA
BY
ATTORNEYS

Sept. 29, 1959  R. L. COTTA  2,906,178
HOB SHIFTING MECHANISM
Filed Sept. 4, 1956  6 Sheets-Sheet 3

INVENTOR.
RALPH L. COTTA
BY
ATTORNEYS

Sept. 29, 1959  R. L. COTTA  2,906,178
HOB SHIFTING MECHANISM
Filed Sept. 4, 1956  6 Sheets-Sheet 4
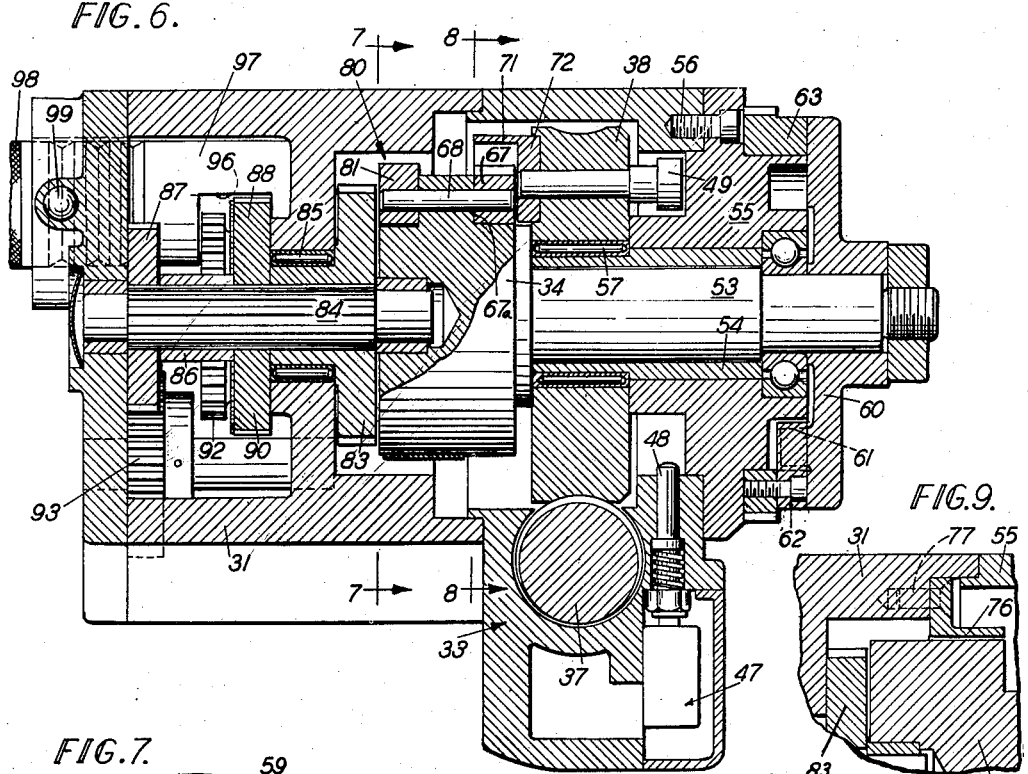
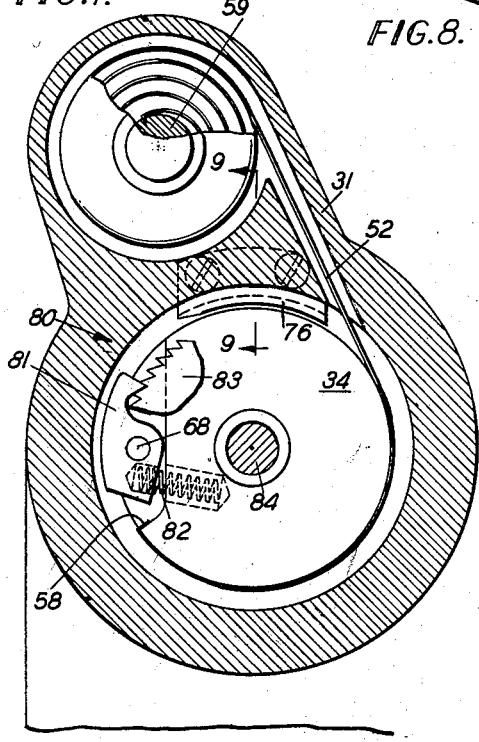
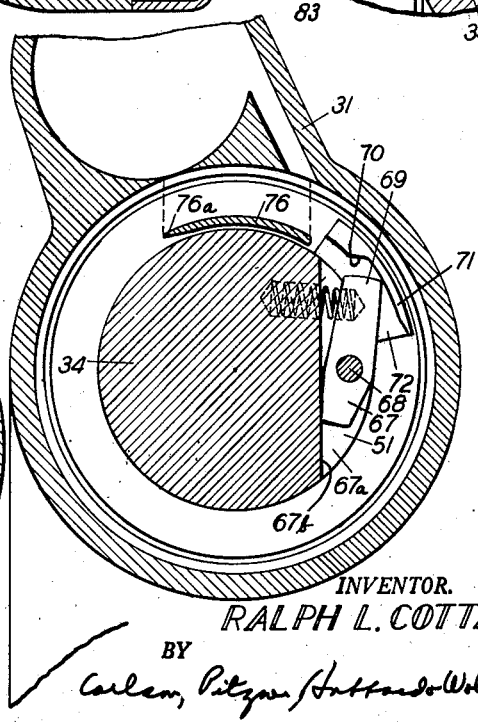
INVENTOR.
RALPH L. COTTA
BY
ATTORNEYS Sept. 29, 1959  R. L. COTTA  2,906,178
HOB SHIFTING MECHANISM
Filed Sept. 4, 1956  6 Sheets-Sheet 5
FIG. 10.
FIG. 11.
FIG. 12.
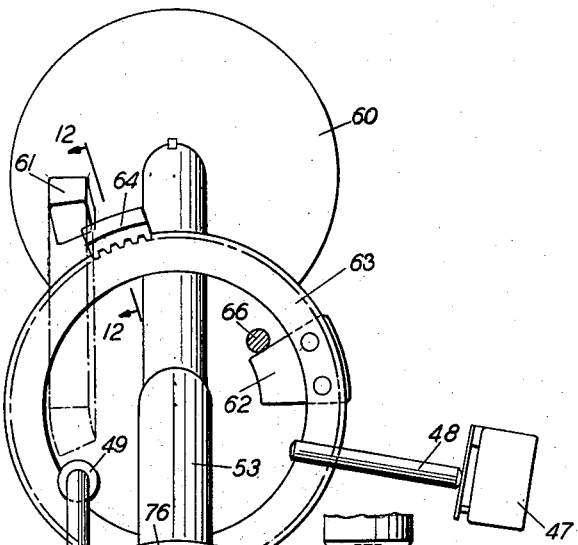
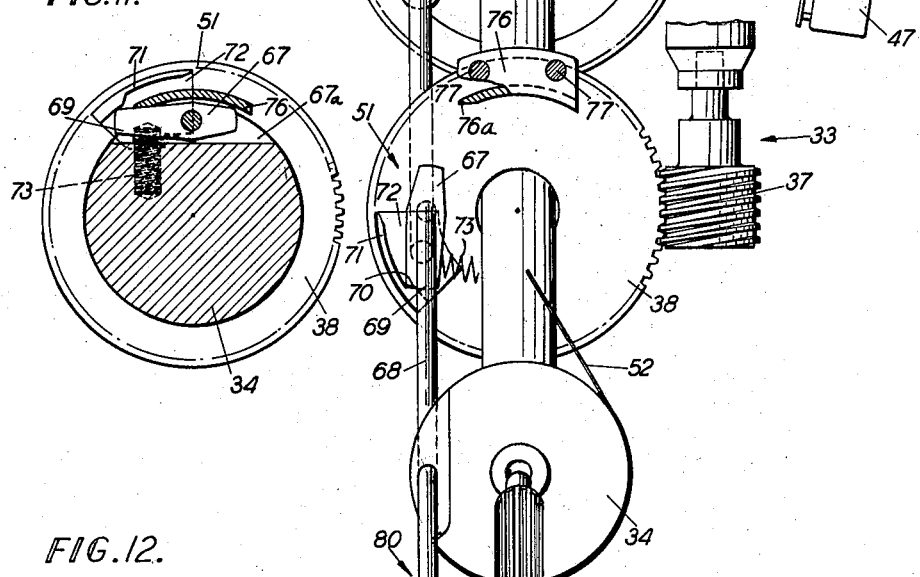
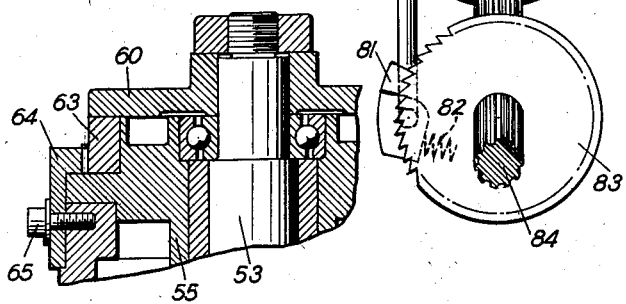
INVENTOR.
RALPH L. COTTA
BY
ATTORNEYS United States Patent Office 2,906,178
Patented Sept. 29, 1959

2,906,178
HOB SHIFTING MECHANISM

Ralph L. Cotta, Rockford, Ill., assignor to Barber-Colman Company, Rockford, Ill., a corporation of Illinois Application September 4, 1956, Serial No. 607,865

7 Claims. (Cl. 90—4)

This invention relates to a mechanism incorporated in a gear hobbing machine for intermittently shifting the hob thereof axially through short increments, for example, a few thousandths of an inch, and thereby bring new teeth of the hob into cutting position for the succeeding machine cycle. In certain of its aspects, the invention is concerned with adjustment of the lengths of the shifting increments and in reversing the directions thereof.

One object is to provide a hob shifting mechanism in which a hob shifting motion accurately adjustable in length and variable in direction is derived from a self-contained power actuator operating unidirectionally in cycles of fixed length.

Another object is to derive the variable length shifting motions from a unidirectionally operable power source through a novel ratchet type coupling whose actuating element is returned to a predetermined starting position after each shift.

Still another object is to adapt the ratchet coupling for interruption of the shifting motion at manually selected points in the cycle of the power actuator.

A further object is to achieve reversal of the hob shift through a novel arrangement of a reversing mechanism with the ratchet coupling.

The invention also resides in the novel construction of the ratchet coupling which enables the actuating element to be released from the power actuator and spring returned to starting position.

Other objects and advantages of the invention will become apparent from the following detailed description taken in connection with the accompanying drawings, in which Figure 1 is a fragmentary front view of a hobbing machine incorporaitng the improved hob shifting mechanism, the cover for which is broken away.

Fig. 6 is a fragmentary sectional view taken along the line 6—6 of Fig. 2.

Figs. 7 and 8 are fragmentary sectional views taken respectively along the lines 7—7 and 8—8 in Fig. 6.

Fig. 9 is a fragmentary section taken along the line 9—9 of Fig. 7.

Fig. 10 is a fragmentary exploded view of the driving parts during a shifting cycle.

Fig. 11 is a fragmentary section similar to Fig. 8 showing the parts in a different position.

Fig. 12 is a fragmentary sectional view taken along the line 12—12 of Fig. 10.

Figure 13:
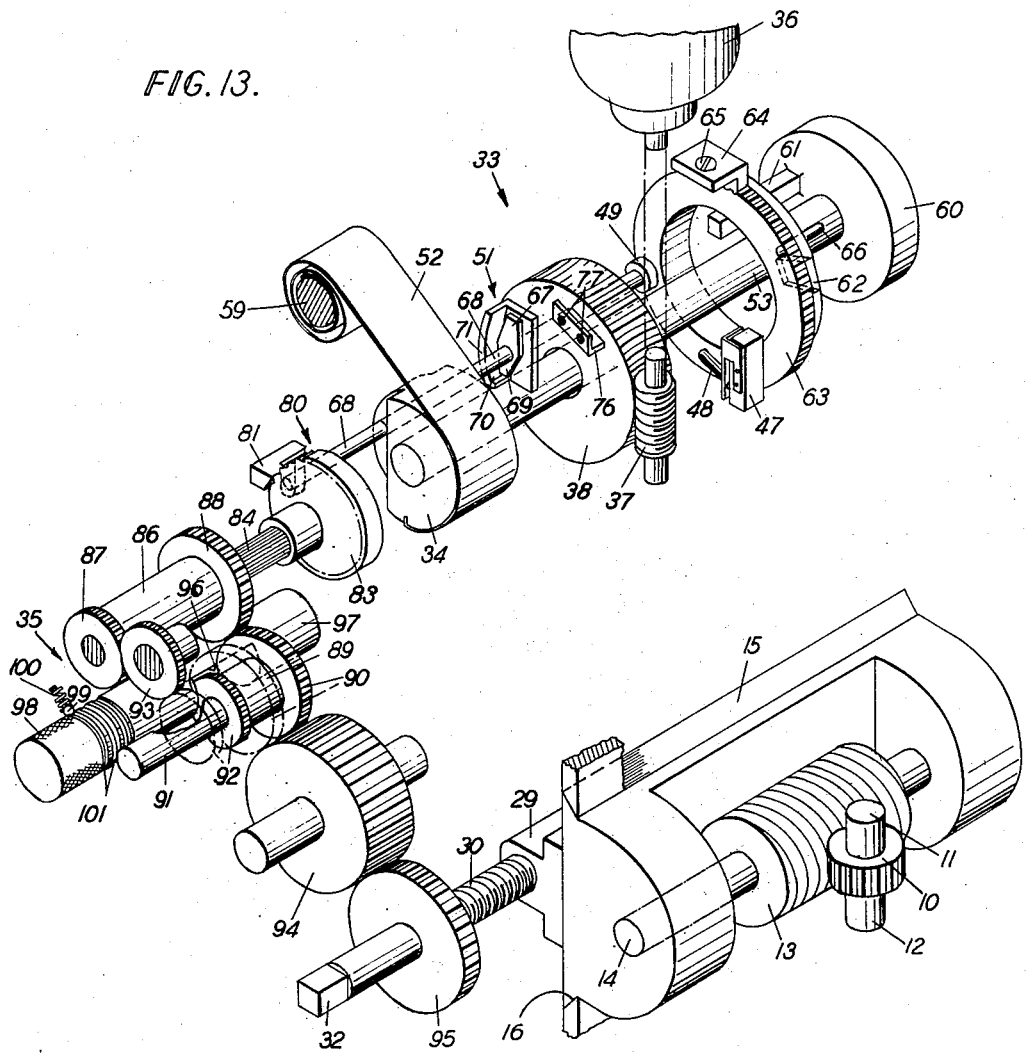

Fig. 13 is a schematic perspective view of the hob shifting mechanism.

While the improved shifting mechanism may be applied to hobbing machines of variable constructions it is, for purposes of illustration, shown in the drawings incorporated in a Barber-Colman so-called type kHM hobbing machine. In the latter, the gear blank 10 to be hobbed is supported between a tailstock 11 and an arbor 12 power rotated about a fixed upright axis in synchronism with the hob 13 which is fed sidewise and upwardly from the starting position shown in Fig. 1 to effect the hobbing of the gear. After the hob has passed the blank and cut the gear, it is retracted horizontally, lowered, and finally returned to the starting position.

Figure 3:
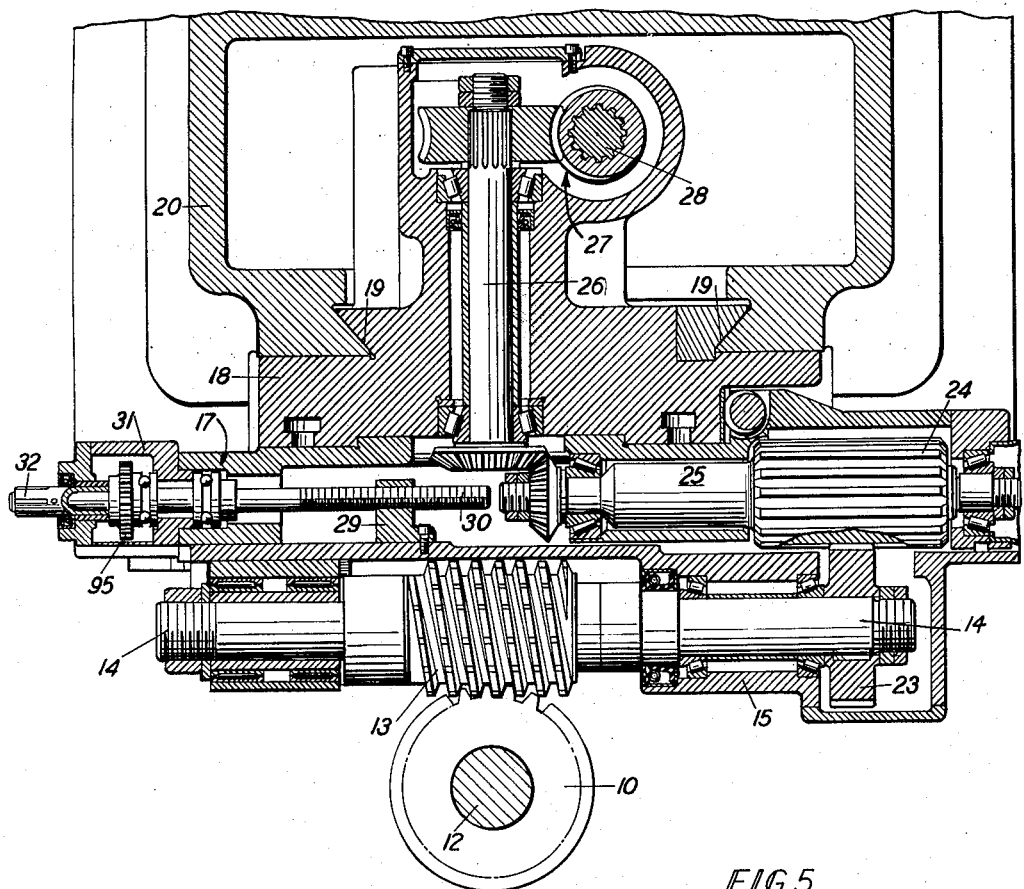
Fig. 3 is a fragmentary sectional view taken along the line 3—3 of Fig. 2.

The hob is secured to a horizontal spindle 14 (Fig. 3) journaled in bearings on a slide 15 guided in ways 16 (Fig. 1) which parallel the hob axis and are carried by the hob swivel 17. The latter is mounted on a slide 18 which moves in ways 19 formed on a column 20 and paralleling the axis of the work blank. Feeding of the slide 18 is effected by a screw 21 (Fig. 1) driven in opposite directions and at feed and rapid return speeds at proper times in the machine cycle. The column 20 slides on horizontal ways 22 and is fed back and forth by a cam mechanism (not shown).

A gear 23 (Fig. 3) on the hob spindle 14 meshes with a gear 24 on the swivel 17 having teeth elongated to provide the desired range of endwise shifting of the hob. The gear shaft 25 is coupled by bevel gears to a shaft 26 centered on the swivel axis and driven through a worm wheel and a worm 27 splined on a main drive shaft 28 which is driven in timed relation to the work drive.

Axial shifting of the hob relative to the swivel 17 is effected by a screw and nut mechanism (Fig. 3) comprising a nut 29 secured to the hob slide 15 and threaded onto a rotary screw 30 journaled in bearings in a housing 31 on the swivel 17. An outwardly projecting end 32 of the screw may be turned manually to adjust the position of the hob for set up purposes.

Figure 1:
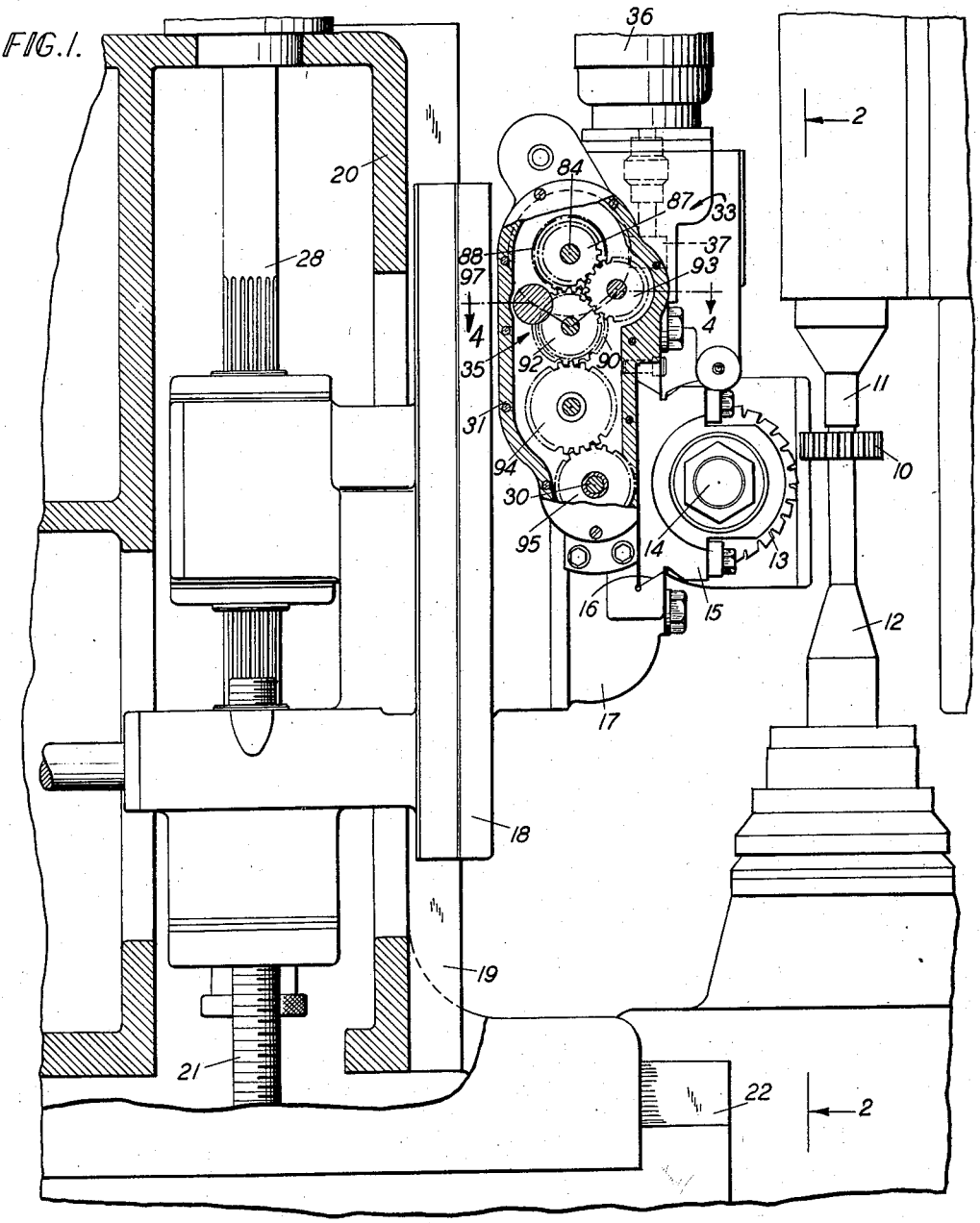
Figure 4:
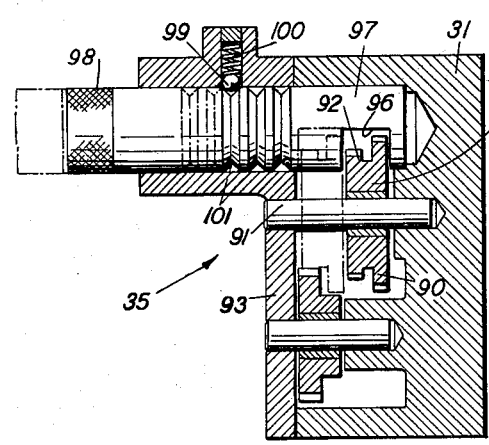
Fig. 4 is a fragmentary sectional view taken along the line 4—4 of Fig. 1.

In accordance with the present invention the screw 30 is turned step-by-step by power derived from an actuator 33 (Figs. 1, 6, 10 and 13) operable unidirectionally through cycles of fixed length, a portion of the motion in each cycle being transmitted to the screw through a ratchet actuated and released by a member 34 and a manually operable reversing mechanism 35 (Figs. 1, 4 and 13). The actuator is a self-contained unit mounted with the housing 31 on the swivel 17 and comprising an electric motor 36 and suitable speed reducing gearing terminating in a vertically disposed shaft coupled to a worm 37 meshing with a worm wheel 38 which turns unidirectionally and through a fixed distance, one revolution in this instance, in each hob shifting cycle.

Figure 2:
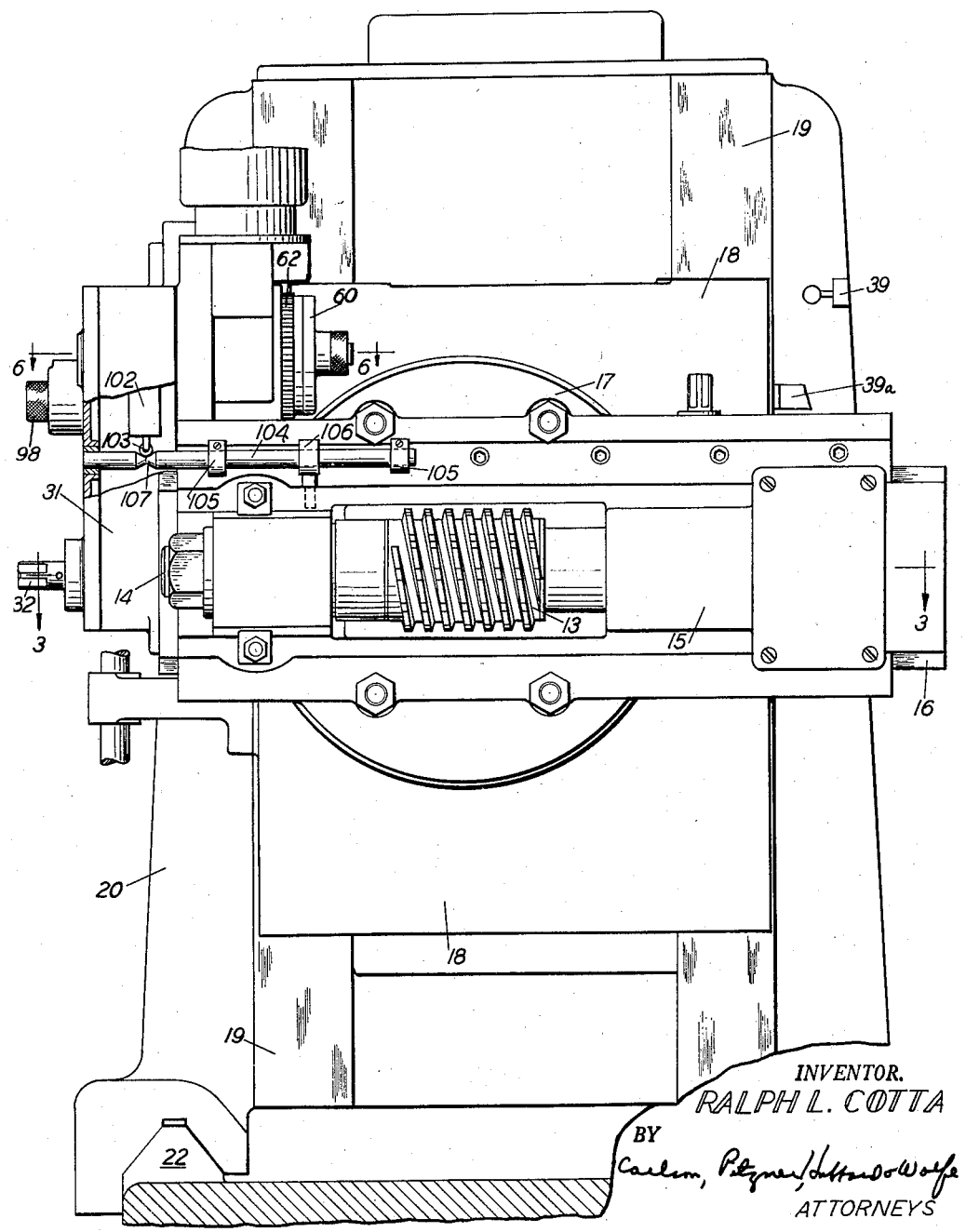
Fig. 2 is a side elevational view taken along the lines 2—2 of Fig. 1.
Figure 5:
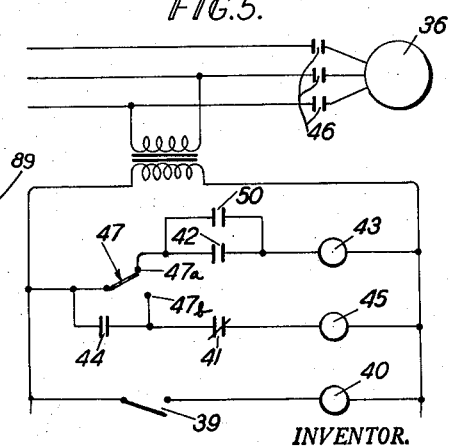
Fig. 5 is a wiring diagram.

A typical circuit for starting and stopping the motor is shown in Fig. 5 and will be described later. Briefly, the motor is started in response to closure of a switch 39 by a dog 39ᵃ (Fig. 2) on the hob slide 18 as the latter finishes its cutting stroke and the hob has passed out of engagement with the finished gear. The motor continues to run until its circuit is interrupted by opening of a switch 47 after the worm wheel has turned through a fixed distance, one revolution in this instance. For this purpose, the switch 47 is mounted on the hob swivel 17 with its actuating pin 48 (Figs. 6, 10 and 13) disposed in the path of a roller 49 carried by the worm wheel 38 and adapted to cam the pin outwardly and actuate the switch to stop the motor after the worm wheel has turned through one revolution away from the starting position in which the roller engages the switch pin.

In the initial portion of each unidirectional cycle of the motor actuator 33, the worm wheel 38 is coupled to the member 34 through one way connection 51 which is released automatically near the end of the cycle to permit the member to be turned reversely as by a spring 52 to a predetermined starting position. Herein the member 34 comprises a disk (Figs. 6, 10 and 13) rigid with one end of a shaft 53 journaled in bushing 54 in an end plate 55 fitting into and secured by screws 56 to the housing 31 of the swivel 17. Bearings 57 on the bushing 54 support the worm wheel 38.

The spring 52 is of the torsion type comprising a band anchored at one end 58 (Fig. 7) on the releasable disk 34 and spirally wrapped at the other end around a stud 59 fixed within the housing 31 so as to urge the disk 34 counterclockwise as viewed in Figs. 7, 10 and 13. A disk 60 keyed to the outer end of the shaft 53 carries a lug 61 engageable with a lug 62 to limit the turning of the disk 34 by the spring and thus determine the normal or starting position of the disk 34.

To permit the length of the hob shift to be adjusted over a relatively wide range, for example, in increments of .001 to .035 of an inch, the normally fixed lug 62 is secured to a ring 63 journaled on the end plate 55 (Fig. 6) and formed around its periphery with teeth interfitting with teeth on a segment 64. The latter is secured by a screw 65 (Figs. 12 and 13) to the end plate 55 and may be removed to permit the ring 63 and the lug 62 to be turned about the shaft 53 to a position determined by the desired length of the hob shift. The position of the stop lug 62 is fixed by replacement of the segment 64. Adjustment of the ring 62 in one direction is limited by engagement of the lug 63 with a pin 66 (Figs. 6 and 13) fixed to the end plate 55. The lug 63, when engaging the pin as shown in Fig. 10, is positioned for causing a hob shift of maximum length.

The one way connection 51 preferably is of the ratchet type and operates to couple the disk 34 to the worm wheel 38 during the preselected part of the motor cycle. It includes a pawl 67 (Figs. 6, 10 and 13) disposed in a recess 67a in the periphery of the disk 34 and fixed on one end of a pin 68 paralleling the axis of the worm wheel and journaled intermediate its ends in the disk near the outer periphery thereof. The end 69 of the pawl is adapted for abutting engagement as shown in Fig. 10 in a notch 70 in a rib 71 of a drive lug 72 attached to the side of the worm wheel in this instance by a pin. A compression spring 73 seated in the disk 34 urges the pawl 67 outwardly to a position determined, when the pawl is free, by contacting of the pawl against the bottom 67b (Fig. 8) of the groove 67a.

After the drive plate 72 has picked up the pawl 67 and turned the latter and the disk 34 away from the selected starting position (Fig. 8), the pawl is disengaged from the notch 70 when the disk reaches a predetermined position. This is effected by a cam 76 (Figs. 8, 9, 10 and 13) fixed to the housing 31 and adapted to enter between the rib 71 and the pawl. Herein, the cam is arcuate in shape comprising a rib concentric with the worm wheel axis and secured by screws 77 to the housing 31 adjacent the junction of the latter and the end plate 55 (see Fig. 9).

It will be seen that with the pawl 67 engaged in the notch 70 of the drive lug 72, the disk 34 will be coupled to the worm wheel as shown in Fig. 10 and will turn clockwise with the latter thereby winding the spring 52 until the pawl encounters the tip 76a of the cam. Then, as the turning continues, the end 67 of the pawl will be cammed inwardly and out of the notch 70 as shown in Fig. 11. With the pawl thus released, the spring 52 will become effective to turn the disk 34 and the pawl counterclockwise until the lug 61 on the disk 60 comes against the lug 62. The pawl is swung outwardly by the spring 73 and is thus in a position to again be picked up by the notch 70 in the next cycle of the motor actuator.

The successive advancing movements of the disk 34 are transmitted to the screw 30 through a second one way drive coupling 80 (Figs. 6, 7, 10 and 13) which permits the disk to be returned to the selected starting position by the spring 52. Herein this coupling is also of the ratchet type comprising a pawl 81 loose on the other end of the pin 68 and urged by a spring 82 into engagement with teeth around the periphery of a ratchet wheel 83. As shown in Fig. 6, the latter is disposed adjacent the disk 34 and fixed to a shaft 84 supported in bearings 85 in the housing 31.

Whenever the cam 76 is out of engagement with the pawl 67, the rockshaft 68 and the pawl 81 thereon will be turned clockwise (Fig. 8) by the springs 73 and 82 until the pawl 81 engages the ratchet teeth as shown in Fig. 8. The disk 34 is thus coupled by the ratchet 80 to the shaft 84 which then turns with the disk during its clockwise turning by the motor as above described.

The reversing mechanism 35 (see Figs. 1, 4, 6 and 13) above referred to includes a sleeve 86 spacing apart gears 87 and 88 which are splined on the shaft 84. In one position of a shiftable gear cluster 89, the gear 88 meshes with the larger gear 90 on the cluster as shown in full in Fig. 13. A pin 91 on the housing 31 supports the cluster 89 to slide back and forth between the positions shown in full and phantom in Fig. 4. In the left hand position also shown in phantom in Fig. 13, the gears 88 and 90 are out of mesh and a gear 92 on the cluster meshes with an idler gear 93 which runs in continuous mesh with the gear 87. The gear 90 meshes at all times with an elongated gear 94 which in turn meshes with a gear 95 fast on the screw shaft 30.

By shifting the cluster 89 from one limit position to another, the direction of turning of the screw during the unidirectional step by step movements of the shaft 84 may be reversed and the direction of the successive shifts of the hob changed as desired. Such shifting of the cluster 89 is effected by a fork 96 (Figs. 4 and 13) on one end of a pin 97 slidable in the housing 31 and having a knurled end 98 on its outwardly exposed end. A ball detent 99 urged against the pin by a spring 100 is adapted to seat in one of a plurality of grooves 101 spaced along the pin thus holding the collar with either set of gears in mesh or in an intermediate neutral position in which both sets of gears are out of mesh.

Suitable means is provided for disabling the entire hobbing machine after the full length of the hob has been brought into operative position. This means may comprise a switch 102 (Fig. 2) included in the starting circuit of the hobbing machine and mounted on the swivel plate 17 with its actuating pin 103 engageable with a rod 104. The latter is slidably supported on the swivel plate alongside the hob slide 15 and carrying spaced adjustable collars 105 disposed on opposite sides of a lug 106 projecting from the hob slide. During normal operation of the hobbing machine, the lug 106 is disposed between the collars 105 and the switch pin is disposed in a groove 107 on the rod allowing the switch to remain closed. The lug 106 moves with the hob slide in the successive shifting movements and, after the full length of the hob has been presented to the work, the lug encounters one of the collars and shifts the rod endwise thus camming the switch pin out of the groove. The switch 102 is thus opened to disable the machine which may be reconditioned for use by manually reversing the direction of the hob shift as described above.

*Operation*

At the end of each cycle of the hobbing machine, the parts thereof come to rest in the positions shown in Fig. 1, the parts of the ratchet coupling 51 of the hob shifting mechanism being positioned as shown in Fig. 8 as a result of the action of the spring 52 at the end of the previous shifting cycle in turning the disk 34 counterclockwise to bring the end of the lug 69 against the stop 70 in the selected position of the latter. In the ensuing hobbing cycle, the hob slide is fed upwardly carrying the hob past the gear blank following which the hob is retracted and rapidly returned downwardly and back to the starting position.

After the hob has passed the finished gear, the dog 39ª encounters the actuating pin of the switch 39 thus closing the latter to energize the relay 40 closing a switch 42 and opening a normally closed switch 41 of this relay. A circuit for energizing a relay 43 is thus completed through the contact switch 47ª which is then held closed by the roller 49 engaging the actuating pin 48 of the switch 47. The relay 43 is held closed by closure of its switch 50. As the rapid return of the hob slide 18 is continued, the switch 39 is allowed to open thereby reclosing the switch 41 which cooperates with the then closed switch 44 of the relay 43 to energize a relay 45 whose switches 46 are closed to start the motor 36 and initiate clockwise turning of the worm wheel 38. As the latter starts to move, the roller 49 moves off from the actuating pin 48 thereby opening the contacts 47ª and closing the contacts 47ᵇ of the switch 47. The relay 43 is deenergized but energization of the relay 45 and operation of the motor are continued through the then closed switches 47ᵇ and 41.

The positions of the disk 34 and the pawls 67 and 81 remain fixed until, after a partial revolution of the worm wheel when the surface 70 of the drive lug 71 comes against the end 69 of the pawl 67 thus coupling the worm wheel to the disk 34. The latter is then turned in unison with the worm wheel, this motion being transmitted to the screw 30 by virtue of the engagement of the pawl 81 with the ratchet wheel 83. The direction of the resulting hob shift is determined by the setting of the reversing mechanism 35.

The short increment of the hob shift is terminated when the ratchet coupling 51 reaches the cam 76 and the pawl 67 is cammed inwardly out of the notch 70 as shown in Fig. 11, the pawl 81 remaining in engagement with the teeth of the ratchet 83. With the ratchet connection 51 broken, the disk 34 is freed for reverse turning by the spring 52, the pawl 81 sliding over the teeth of the ratchet wheel 83. The idle return of the actuating disk 34 back to the starting position is determined by engagement of the lug 61 with the stop 62.

After interruption of the hob shift, the motor 36 continues to run until the worm wheel 38 has completed its revolution and the roller 49 thereon has encountered and depressed the actuating pin 48 to close the switch 47ª and open the switch 47ᵇ. The circuit for the relay 43 is thus interrupted and the motor operation thereby terminated with the roller 49 still engaging and depressing the switch pin 48.

It will be apparent from the foregoing that the motor actuator operates unidirectionally in cycles of fixed length (one revolution), and that a selected portion of this motion is utilized to shift the hob through one increment. The length of this increment is determined by the extent of the return motion of the disk 34 by the spring 52 after the ratchet couplings 51 and 80 have been disengaged by the cam 76. Thus, by adjusting the angular position of the ring 63 and the stop 62 thereon, any desired length of hob shift may be produced within a relative wide range. In this way, the hob shifting increment can be easily adapted to the widely varying conditions that are encountered in service use of the hobbing machine.

I claim as my invention:

1. In a hobbing machine, the combination of, a slide for supporting a rotary hob for axial shifting, means providing a source of rotary power terminating in a slow speed drive shaft, a rotary member, a stop for limiting the turning thereof in one direction to a predetermined angular position, means yieldably biasing said member toward said position, a first one way connection coupling said shaft and said member together for turning in unison away from said position including a releasable pawl, normally stationary means operable upon engagement by said pawl to release the latter and permit return of the member to said position, and means including a second pawl and ratchet mechanism coupling said member to said hob slide and operable to advance said slide during turning of said member with said shaft, said second pawl being movable in unison with said first pawl.

2. In a hobbing machine, the combination of, a slide for supporting a hob for axial shifting, means for relatively moving said slide and a work blank relative to each other in a normal hobbing cycle, an electric motor terminating in a slow speed shaft, control means operable to start said motor after disengagement of the hob from the blank in said cycle and to continue such operation for a predetermined amount of turning of said shaft, a stop, a rotary member normally urged to a predetermined position against said stop, mechanism including two one way connections respectively coupling said member to said shaft and to said hob slide and adapted when engaged to transmit the motion of said shaft to said slide and correspondingly shift the latter axially, and stationarily mounted means operable during turning of said member to release the connection between said member and said motor to permit return of the member to said normal position.

3. In a hobbing machine, the combination of, a slide for supporting a hob for axial shifting, means for relatively moving said slide and a work blank relative to each other in a normal hobbing cycle, an electric motor terminating in a slow speed shaft, control means operable to start said motor after disengagement of the hob from the blank in said cycle and to continue such operation for a predetermined amount of turning of said shaft, a stop, a rotary member, a spring normally urging said member to a predetermined position against said stop, mechanism including two one way connections respectively coupling said member to said shaft and to said hob slide and adapted when engaged to transmit the motion of said shaft to said slide and correspondingly shift the latter axially, and stationarily mounted means operable during turning of said member to release the connection between the member and said motor whereby to free the member for return to said normal position.

4. In a hobbing machine, the combination of, a slide for supporting a rotary hob for axial shifting, means providing a source of rotary power terminating in a slow speed drive shaft, a rotary member, a stop for limiting the turning thereof in one direction to a predetermined angular position, means yieldably biasing said member toward said position, a first one way connection coupling said shaft and said member together for turning in unison away from said position including a releasable pawl, a second one way connection coupling said member to said hob slide and operable to advance said slide during turning of said member with said shaft, and stationary means for releasing said first connection after turning of said member through an angle determined by the spacing of said stationary means from said stop.

5. In a hobbing machine, the combination of, a slide for supporting a rotary hob for axial shifting, means providing a source of rotary power terminating in a slow speed drive shaft, a rotary member, a stop disposed in the path of said member and adapted for abutment with the member to limit turning thereof in one direction to a predetermined angular position, means by which the position of said stop may be adjusted angularly, means yieldably biasing said member toward said stop and into abutment with said stop at said position, a one way connection coupling said shaft and said member together for turning in unison away from said position including a releasable pawl, and normally stationary means operable upon engagement by said pawl to release the latter and permit return of the member to said position.

6. Hob shifting mechanism as defined by claim 5 in which said member turns through less than a full revolution away from said stop before release of said pawl.

7. In a hobbing machine, the combination of, a slide for supporting a rotary hob for axial shifting, means providing a source of rotary power terminating in a slow speed drive shaft, a rotary member, a stop disposed in the path of said member for limiting the turning thereof in one direction to a predetermined angular position, means yieldably biasing said member toward said position and into abutting engagement with said stop an electric motor actuator adapted when energized to turn said shaft through a predetermined angular range against the force of said biasing means, mechanism for coupling said shaft and said member together for turning in unison between angularly spaced coupling and uncoupling positions intermediate both ends of said range, stationarily mounted means for disconnecting said shaft and said member at said uncoupling position, and means supporting said stop for angular adjustment to determine the initial spacing of said member away from said coupling position.

References Cited in the file of this patent

UNITED STATES PATENTS

| | | |
|---|---|---|
| 2,481,974 | Bradner | Sept. 13 1949 |
| 2,802,402 | Perger | Aug. 13, 1957 |